Nov. 13, 1962 V. R. SCHMITT 3,063,426
PISTON-VALVE ACTUATOR
Filed June 13, 1961 2 Sheets-Sheet 1

INVENTOR.
VERNON R. SCHMITT
BY
ATTORNEYS 3,063,426
PISTON-VALVE ACTUATOR
Vernon R. Schmitt, Grove City, Ohio, assignor to the United States of America as represented by the Secretary of the Air Force
Filed June 13, 1961, Ser. No. 116,893
3 Claims. (Cl. 121—41)
(Granted under Title 35, U.S. Code (1952), sec. 266)

The invention that is described herein may be manufactured and used by or for the United States Government for governmental purposes without the payment to me of any royalty thereon.

This invention relates to a new and improved actuator used in an aircraft flight control system and more particularly to a compact actuator of the aerodynamic control surfaces of an aircraft operating over a wide range of environmental conditions inclusive of those experienced during re-entry into the atmosphere of the earth and the like.

The control surfaces of high speed aircraft are subjected to great pressures that are abruptly applied and abruptly removed during re-entry into the earth's atmosphere at high velocities; they are subjected to high temperatures; and under atomic warfare conditions they are subjected to radiation effects.

This invention has as its objects the provision of a sturdy, dependable, compact and enclosed actuator that successfully operates aircraft control surfaces under abruptly applied and removed loads of great magnitudes; under the very wide temperature range that is experienced by satellites and jet aircraft in flights in and out of the earth's atmosphere; and the actuator is well enclosed which minimizes damage under contamination conditions such as from salt spray, dust, atomic energy contamination and the like.

The actuator consists of a cylinder containing a piston that encloses a valve responsive to electrical signal and operating in sense and magnitude the controls of an aircraft to the airframe of which either the actuator piston or the cylinder is attached with the unattached piston or cylinder connected with the control.

An illustrative embodiment of the present invention is shown in the accompanying drawing wherein.

Figure 1:
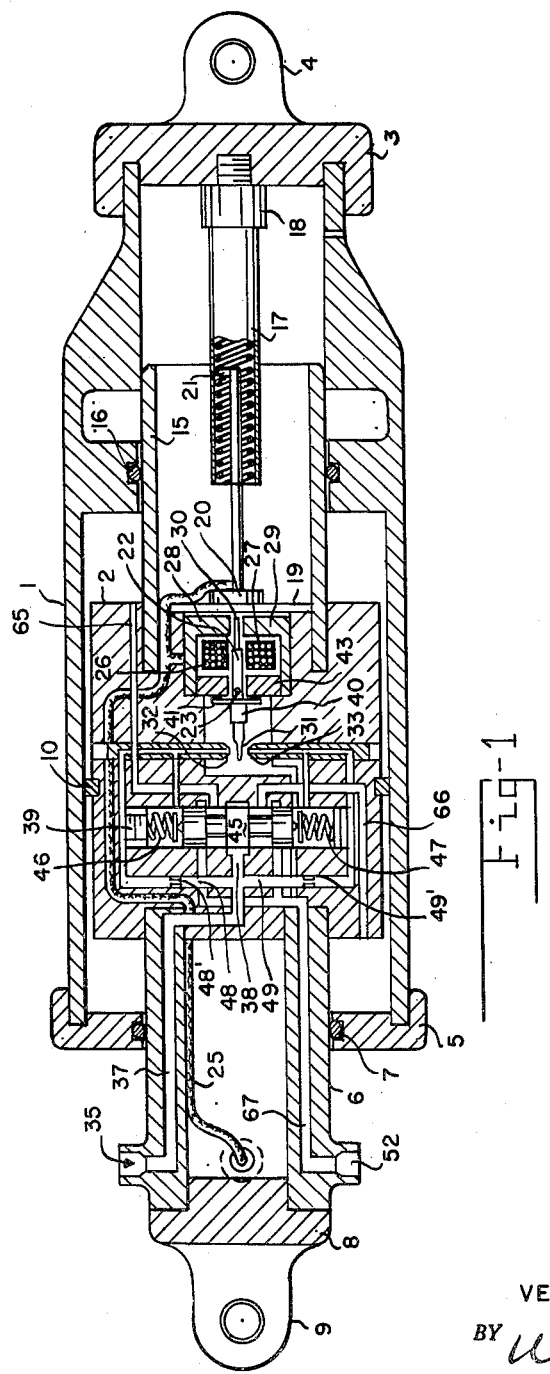
FIG. 1 is an axial sectional view of a device that embodies the present invention.

The actuator that is shown in FIG. 1 of the accompanying drawing comprises a cylinder within which a piston is enclosed. Force is delivered by the actuator upon the arrival of electrical signal causing linear displacement between the piston and the cylinder.

The actuator is of the ram cylinder type, with the cylinder housing a hydraulic servo control valve responsive to electrical signal delivered to the piston for actuating an aerodynamic control surface in an aircraft flight control system.

The actuator comprises a cylinder 1 and a piston 2 that are adapted for axial motion with respect to each other delivered from the ends of the cylinder and the piston, with one attached to the aircraft airframe and the other connected through intervening members, not shown, to deliver controlling force to a desired object such as a control surface of the aircraft in which the actuator is mounted, or the like.

The cylinder 1 has an attaching right hand end cap 3 threaded on its right hand end. The cylinder end cap 3 has an attaching ear 4 extending axially from the assembly and apertured for receiving a bolt in the aperture as an attaching means to either the airframe of the aircraft or to connecting members between the actuator and a control surface such as an elevator, rudder or the like that is to be operated mechanically by the actuator.

The cylinder 1 has a centrally apertured ring cap 5 threaded on its end remote from the attaching cap 3. The ring cap 5 central aperture is occupied by a piston rod 6 sealed with an O-ring 7 or the like that is shown housed in a groove in the inner edge of the ring cap 5 and making sliding and sealing engagement with the piston rod 6 as it is moved axially of the assembly. The piston rod 6 has an attaching means at its free end, such as an attaching cap 8 that is threaded on its end remote from the piston 2.

The piston rod attaching cap 8 has an ear 9 at its left hand end remote from the cylinder 1. The ear 9 is adapted for being secured to the airframe or to a connector member not attached to the first cylinder cap ear 4, by being apertured to receive a bolt or the like.

The end of the piston rod 6 that is remote from its attaching cap 8 threads into the left hand end of the piston 2. A piston ring 10 seals the piston 2 in the bore of the cylinder 1. A piston skirt 15 threads into the right hand end of the piston 2 and extends axially of the cylinder 1. The piston skirt 15 makes sealing engagement with the bore of the cylinder 1 by means of a sealing O ring 16 or the like that is housed in a groove in the bore of the cylinder.

A potentiometer resistor 17 is carried by a mounting pad 18 that threads into the right hand end cap 3 to extend axially within the cylinder. The right hand end of the piston 2 has attached thereto with screws or the like, not shown, a potentiometer contact brush mounting plate 19 to the center of which the mounting pad 20 of a spring loaded potentiometer sliding contact 21 is attached by being welded thereto, by screws or the like, as preferred. The potentiometer resistor 17 is contacted in wiping engagement by the sliding contact 21 with any movement of the piston 2.

Figure 2:
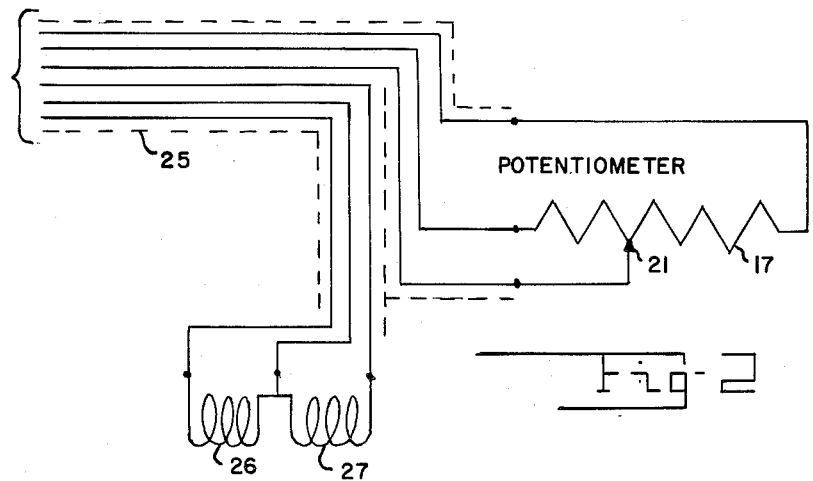
FIG. 2 is a fragmentary circuit diagram within the actuator shown in FIG. 1.

An electrical cable 25 carries signal that operates the actuator and places the potentiometer resistor 17 and the potentiometer resistor sliding contact 21 in circuit as illustrated in FIG. 2 of the drawing. The cable 25 provides the controlled energization of a pair of torque motor coils 26 and 27 that selectively impart magnetic fields to the electromagnetic poles 28 and 29 on opposite sides of the flapper valve armature 30.

The flapper 22 is pivoted at 23 and continues remote from its armature end in a baffle 31 end spaced midway between duplicate fluid discharge orifices in the pair of nozzles 32 and 33 with equal magnetic fields in the poles 28 and 29.

The operation of the flapper valve is controlled by electrical signal arriving over the cable 25 that determines the strength of the relative magnetic fields impressed on the poles 28 and 29. The flapper valve 22 in turn controls the position of the piston 2 axially of the cylinder 1 by controlling the hydraulic system of the actuator.

The hydraulic fluid is sealed from between the magnetic poles 28 and 29 by a flexible but tough plastic sleeve 40. The sleeve 40 is moulded in a firm mechanical seal at its end near the baffle 31 and its opposite end is flared into a flange that is clamped between a metal washer 41 by screws, not shown, that pass through the valves into the plastic ring 43. The plastic ring 43 is in sealing relation with the end of the cylindrical magnet structure remote from the poles 28 and 29.

The hydraulic fluid illustratively is a desired mixture of glycerides and alcohols, such as are used in internal combustion motor cooling systems, transmission systems and the like.

Figure 3:
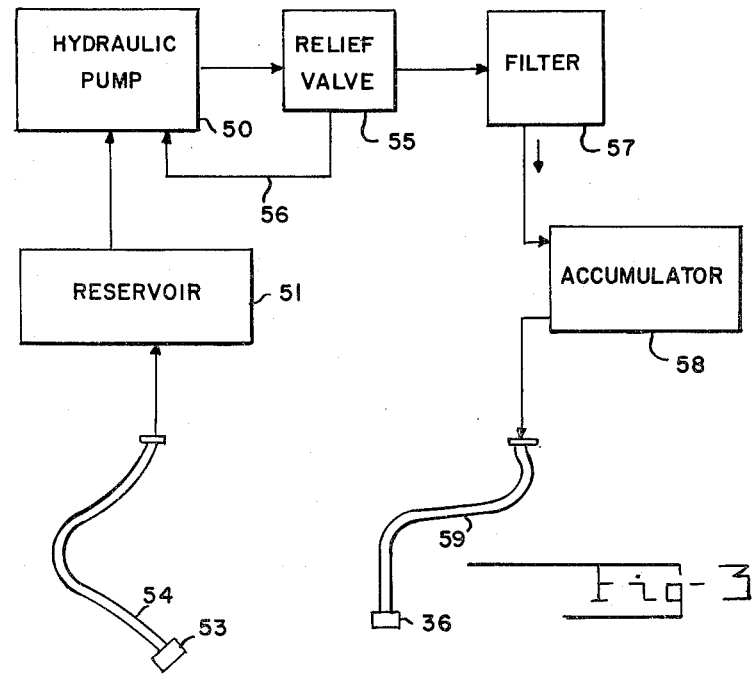
FIG. 3 is a diagram of the hydraulic system for the actuator shown in FIG. 1.

The hydraulic fluid enters the actuator pressurized at the inlet port 35 through a coupling 36 port of the hydraulic system shown in FIG. 3 of the drawing.

The hydraulic fluid is conducted by the fluid inlet passage 37 axially of the piston rod 6 and the piston 1 to the piston hydraulic valve input port 38 midway between the ends of the cylindrical compartment that houses the hydraulic fluid channeling valve 45.

The hydraulic valve 45 is of the peripherally grooved or spool type and is mounted for linear movement against the yielding resilience of coil springs 46 and 47 positioned within the valve cylinder at the opposite ends of the valve 45. The springs 46 and 47 are adjusted by the threaded screw 39 through an aperture in the piston 1 that is subsequently filled and sealed.

Pressurized fluid in the passage 37 and hydraulic valve input port 38 in the piston 2 also occupies a pair of radial passages 48 and 49, each of which contains a flow restrictor 48' and 49' that minimize fluid surge pressures during the operation of the device. The pair of radial passages 48 and 49 continue in axially extending passages that open directly into the bases of both the nozzles 32 and 33 and into the opposite end spring housing cavities in the cylinder that houses the hydraulic valve 45, to which system in its static state a constant high pressure is maintained by a hydraulic pump 50 in the schematic hydraulic flow system shown in FIG. 3 of the drawings.

In FIG. 3 of the drawings the hydraulic pump 50 receives its input from the reservoir 51 that is fed from the actuator fluid return orifice 52 into which the coupling 53 of the hose 54 threads. The hydraulic pump 50 applies to the hydraulic fluid a pressure that is controlled by the relief valve 55 that is provided with a back flow connection 56 to the hydraulic pump. Output pressurized hydraulic fluid from the relief valve 55 is clarified by a filter 57 and is passed through the accumulator 58 and through the flexible high pressure hose 59 that has its coupling 36 threaded into the fluid pressurized inlet port 35 of the actuator shown in FIG. 1.

Electrical signal arriving over the cable 25 is impressed on one of the coils 26 or 27 to amplify the magnetic attraction of the corresponding magnetic pole 28 or 29 for the flapper valve armature 30 and to cause the flapper valve baffle 31 to be advanced toward one and away from the other of the discharge orifices of the pair of nozzles 32 and 33.

Advancing the baffle 31 toward one nozzle orifice and away from the other nozzle orifice amplifies the pressure differential between the fluid passages affected.

For example, when the baffle 31 is caused to progressively approach the upper nozzle orifice in FIG. 1 the fluid flow-out of the upper nozzle is retarded and the fluid flow-out of the lower nozzle encounters a diminished resistance accompanied by a pressure drop in the lower spring compartment and a pressure increase in the upper spring compartment. The pressure differential change causes the movement downward of the spool-shaped hydraulic valve 45. The downward movement of the valve 45 within its cylinder uncovers its central input port 38 to admit pressurized hydraulic fluid that follows the passage 65 to the cylinder compartment to the right of the piston while the cylinder compartment to the left of the piston evacuates the hydraulic fluid it contains through the piston passage 66, through the hydraulic valve cylinder to the piston rod passage 67 and the hydraulic fluid leaves the system at the hydraulic fluid outlet port 52, thereby forcing the cylinder 1 toward the right of the piston 2 and placing both the cylinder and the piston in thrust in accomplishing work between the ears 4 and 9. The magnitude of the applied force is only limited by the amount of pressure that can be applied to the hydraulic fluid in the system. The movement of the piston 2 to the left of the cylinder 1 draws the potentiometer contact brush 19 to the left of the potentiometer resistor winding 17. The baffle 31 approaches the upper nozzle orifice 32 to retard the fluid flow out from the nozzle 32 in response to the greater relative magnetic force in the magnet pole 29 than in the magnet pole 28. A potentiometer resistor converts electrical energy into heat. The movement of the potentiometer contact 21 along the potentiometer resistor 17 increasingly inserts increasing quantities of resistance to the flow of electrical energy through the winding of the coil 26 and diminishes the strength of the electromagnet 28 at the same time it increases the flow of electrical energy through the winding of the coil 27 and increases the strength of the electromagnet pole 29. The phenomena is relative and at no time is the strength of either magnet pole 28 or 29 completely nullified.

The reverse of the above described procedure causes the ears 4 and 9 to approach each other and to push the potentiometer contact brush 19 to the right of the potentiometer resistor winding 17 as the hydraulic fluid is drained out of the right hand piston cavity through the passage 65 and through the hydraulic valve cylinder and out of the hydraulic fluid outlet port 52 after the hydraulic valve 45 has been forced upwardly in its cylinder as the close proximity of the baffle 31 to the lower orifice of the lower nozzle 33 elevates the pressure in the hydraulic valve lower spring 47 cavity and reduces the pressure in the hydraulic valve upper spring 46 cavity such that the hydraulic flow controlling valve 45 moves upwardly in its cylinder.

This invention has potential application in military flight control systems operating in a high temperature environment which is experienced by an air vehicle upon re-entry into the earth's atmosphere. The compactness of the actuator adapts it for installation in thin airfoils of aircraft operating at high Mach numbers. The actuator has its operating parts well enclosed and protected from environmental impairing or detrimental materials.

In the described manner the work done by the actuator that is described herein exerts a force in a linear direction and of a desired magnitude promptly and effectively in response to electrical signal that controls the relative magnetic force that is exerted by one of the magnetic poles 28 or 29 on the flapper valve baffle 31.

The actuator is sufficiently slim to be fitted into a narrow space and the only limitation on the magnitude of the force that it delivers is the force that is imparted to the hydraulic fluid and the strength of the materials out of which the actuator is made.

It is to be understood that the actuator that is shown and described herein is an operative reduction to practice of the invention disclosed herein and that similarly operating modifications may be made in the parts and in the assembly of the parts without departing from the invention here of interest.

I claim:

1. A piston valve actuator that comprises a cylinder for retaining a hydraulic fluid, a piston disposed within the cylinder with a fluid receiving compartment at each end of the piston, a piston rod attached at one end to the piston and extending from an end of the cylinder, flapper valve means within the piston inside of the cylinder, an electrical conductor means positioned inside of the piston and extending to outside the actuator, and hydraulic valve means within the piston inside of the cylinder and actuated by the flapper valve means for moving the piston axially of the cylinder in response to the receipt by the flapper valve means of an electrical signal transmitted to the electrical conductor means.

2. The actuator defined by the above claim 1, inclusive of a cylinder end attaching means, and a piston rod end attaching means remote from the cylinder end attaching means and the actuator adapted for delivering linear displacement work between the remote attaching means.

3. The actuator defined by the above claim 1, inclusive of a potentiometer resistor winding within the cylinder, and a potentiometer contact variably engaging the resistor winding in electrical contact therewith in response to relative displacement between the piston and the cylinder.

References Cited in the file of this patent

UNITED STATES PATENTS

| | | |
|---|---|---|
| 2,886,009 | Myers | May 12, 1959 |
| 2,886,010 | Hayos et al. | May 12, 1959 |